US006411328B1

(12) United States Patent
Franke et al.

(10) Patent No.: US 6,411,328 B1
(45) Date of Patent: *Jun. 25, 2002

(54) METHOD AND APPARATUS FOR TRAFFIC INCIDENT DETECTION

(75) Inventors: Ernest A. Franke; Ernest S. Kinkler, both of San Antonio, TX (US); Michael J. Magee, Laramie, WY (US); Steven B. Seida, San Antonio, TX (US)

(73) Assignee: Southwest Research Institute, San Antonio, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/968,916

(22) Filed: Nov. 6, 1997

Related U.S. Application Data

(63) Continuation of application No. 08/565,144, filed on Dec. 1, 1995, now abandoned.

(51) Int. Cl.$^7$ ................................................. H04N 7/18
(52) U.S. Cl. ........................ 348/149; 340/937; 348/164; 348/169; 382/104
(58) Field of Search ................................ 348/143, 144, 348/148, 149, 164, 169; 382/103, 104; 701/207, 117, 118, 119; 340/937; H04N 7/18

(56) References Cited

U.S. PATENT DOCUMENTS

| | | |
|---|---|---|
| 4,317,117 A | 2/1982 | Chasek |
| 4,847,772 A | 7/1989 | Michalopoulos et al. |
| 5,001,558 A | 3/1991 | Burley et al. |
| 5,161,107 A | 11/1992 | Mayeaux et al. |
| 5,265,172 A | 11/1993 | Markandey et al. |
| 5,280,530 A | 1/1994 | Trew et al. |
| 5,283,573 A | 2/1994 | Takatou et al. |
| 5,285,273 A | 2/1994 | James et al. |
| 5,296,852 A | 3/1994 | Rathi |
| 5,301,239 A | 4/1994 | Toyama et al. |
| 5,317,311 A | 5/1994 | Martell et al. |
| 5,375,058 A | 12/1994 | Bass |
| 5,396,429 A | 3/1995 | Hanchett |
| 5,402,118 A | 3/1995 | Aoki |
| 5,416,711 A | 5/1995 | Gran et al. ................. 364/436 |
| 5,448,484 A | 9/1995 | Bullock et al. |
| 5,463,698 A | 10/1995 | Meyer |
| 5,557,543 A * | 9/1996 | Parsons ....................... 364/516 |
| 5,559,496 A | 9/1996 | Dubats |

* cited by examiner

Primary Examiner—Howard Britton
(74) Attorney, Agent, or Firm—Baker Botts L.L.P.

(57) ABSTRACT

Apparatus and methods effective for detecting, locating and characterizing traffic-related incidents are based upon improved image processing techniques applied to infrared and visible light spectrum roadway images in a time sequence. Substantially real-time isolation and identification of anomalous or unexpected traffic conditions allows control of traffic signals and dispatch of law enforcement, maintenance or emergency medical care resources to reduce cost and increase safety. Detectable traffic-related incidents include, for example, the appearance of a stationary object on a roadway, the appearance of a pedestrian on a roadway, and the identification and location of vehicles obstructing traffic flow by moving too slowly or erratically or in the wrong direction. Programmable digital computer image processing allows automatic classification of the severity of detected incidents based on the potential for further traffic hazards and injuries, and can support automatic signals to alter traffic flow patterns for reducing the likelihood of incidents, as well as automatic alerts to law enforcement, maintenance and emergency medical personnel.

22 Claims, 1 Drawing Sheet

METHOD AND APPARATUS FOR TRAFFIC INCIDENT DETECTION

This is a continuation of application Ser. No. 08/565,144 filed on Dec. 1, 1995, now abandoned.

BACKGROUND

Improving Transportation Systems

The freeways and other roadways that constitute a major portion of the United States transportation system are being required to carry increasing amounts of traffic while funds for new construction and upgrades are limited. As a result, much attention and effort has been focused on methods of increasing the capacity, safety, and utility of existing road systems by early detection of accidents and rapid corrective action to restore normal traffic flow.

The Intelligent Transportation Systems (ITS's) initiative has provided development incentives and testbeds for sensor-based systems that can detect significant changes in traffic flow patterns and infer the reasons for the changes. While many traffic management systems are focused on the detection and control of congestion on freeways, a strong emphasis exists within the ITS initiatives to provide for quick detection of traffic-related incidents such that injured motorists may receive potentially lifesaving medical attention more rapidly and so resulting traffic congestion and delays may be mitigated by more timely identification and clearing of the incidents.

Typically, ITS freeways have been instrumented with inductive loop sensors in the road surface or color video cameras mounted overhead as described in U.S. Pat. No. 4,847,772, Jul. 11, 1989 (Michalopoulos, et al.), incorporated herein by reference. More recently described systems use infrared sensors alone or in combination with color video cameras as in U.S. Pat. No. 5,416,711, May 16, 1995 (Gran et al.), incorporated herein by reference. Camera(s) and/or inductive loop sensors are typically connected to a control center where computer algorithms operate on vehicle presence and/or activity as inferred by changes in a video image, bright points or "hot spots" in an infrared image or by currents induced in inductive loop sensors. Various parameters of the objects and/or events detected are processed mathematically and/or evaluated by human operators to detect unusual events such as slowdowns, stoppages or erratic traffic flow. These detected events are in turn used to infer the presence of one or more traffic-related incidents (that is, precipitating causes) on the roadway and either initiate automatic response sequences or alert human operators who can then direct video cameras (equipped with pan, tilt and zoom controls) for detailed observation and verification of an incident before taking corrective action. Most incidents are currently identified by operators observing video images or inferred by computational processing of the outputs of inductive loop detectors to determine the presence of materially altered traffic flow (frequently resulting in congestion) on the freeway. Any congestion so determined ostensibly results from the presence of an incident. Traffic condition monitors using inductive loop detectors at reasonable intervals of ¼ mile or more have been in use for many years, while camera-based systems are more recent.

The relatively small number of visible spectrum and/or infrared camera-based systems currently in use essentially provide the same information as an inductive loop detector array, but they do it more quickly and with generally greater resolution. Camera-based systems, however, are usually costly and complex, and they have limited range. Current camera-based vehicle presence sensors are basically template comparators or hot spot detectors (as in Gran et al.) which operate to determine whether or not a vehicle is within a specified location in a camera image; they are typically used where inductive loop detectors cannot conveniently be installed. Substantially all commercially available combinations of inductive loop and camera-based vehicle sensors for detecting traffic incidents suffer from limitations in performance, resolution, reliability and sensitivity.

General Sensor Limitations:

Performance limitations for inductive loop and camera-based vehicle sensors currently used as traffic incident detectors often include slow responses, missed incidents, false alarms, and uncertainty as to what event is detected. Today, most traffic incident notification is achieved within traffic monitoring systems by monitoring or using police dispatch networks, even when inductive loop and camera-based vehicle detector systems are in place.

Vehicle presence and, in some cases, vehicle speed and density estimates derived from inductive loop and/or camera-based vehicle detectors have historically been poor indicators of traffic incidents. These systems frequently operate to detect traffic congestion and alert an operator to look for an incident. On many (even most) occasions, there are no determinable causes for congestion to be found because the system has alerted on recurrent congestion or the incident causing the congestion was transient in nature (such as a car stopped for a moment) and the incident has disappeared before the congestion is detected. In some cases, the precipitating event, such as a pedestrian or a separated tire tread in the roadway, remains completely invisible to the sensors employed at all times. Such common traffic hazards are not reliably detected by any known system currently in use because they are not hot enough to be seen by hot spot infrared sensors and/or because they do not activate inductive loop sensors and/or because their visible spectrum images are too faint to be detected by the color video cameras in use. Some currently-described infrared sensors are even designed specifically to reject people in an image (see Gran et al., describing an infrared sensor system which operates in the 2–5 micron wavelength range for high target emission and high atmospheric transparency).

Other impediments to reliance on camera-based systems include variations between day and night lighting conditions, rain, fog, and other inclement weather conditions, optical distortion due to thermal air currents over the hot road surface, differences in image size of a vehicle depending on its distance from the camera, differences in the speed of vehicles, and possible vibration of cameras mounted on supports over the roadway. While vision-based vehicle detectors can be sensitive to nonmetallic objects, they are also sensitive to shadows and are subject to visibility limitations caused by fog, snow, rain, smoke, etc., and by very low ambient light levels.

Camera-based vehicle detectors are also very sensitive to alignment. The associated cameras cannot be moved or used for surveillance because lengthy and sophisticated procedures are required to re-align the system after even slight movement. This phenomenon results in significant maintenance expense for this type of vehicle detector after even slight camera pole movement (sometimes caused by other utilities that use the same pole). The effects of material creep, metal fatigue, warping, nearby construction, or temperature changes will often result in the need for a lengthy re-alignment procedure.

Sensor Resolution:

Poor resolution of vehicle data along a roadway is one of the major factors contributing to poor performance of current systems based on inductive loops, hot spot infrared detectors, and vision-based vehicle detectors. Placement of inductive loop detectors at closer intervals than ¼ mile has proven impractical, and many applications involve spacings of ½ mile or more. Infrared cameras for detecting hot spots (see Gran et al.) do not easily resolve relatively distant and thus closely-spaced hot spots. Although Gran et al. describes the use of interchangeable lenses to provide the appropriate field of view coverage, such a system can not realistically be considered for substantially real-time applications. And adding more sensors (such as cameras) also has limited utility because each vehicle detector location has associated with it a surface enclosure with power, processing, and communications equipment requirements.

Sensor Reliability:

Many inductive loop detectors in a typical system are not working at any given time. To a lesser extent, multi-camera systems suffer from the same shortcoming. Construction, weather extremes, corrosion, paving flow, etc. are hazards to the loop detectors buried in the pavement. Yearly maintenance costs, especially in northern states where very cold temperatures, ice, and salt are present in winter, can be very high.

Sensor Sensitivity:

Inductive loop vehicle detectors depend on the ferromagnetic qualities of metal vehicles for their operation, and hot spot infrared detectors depend on substantially elevated temperatures of the same vehicles. Most inductive loop and hot spot infrared vehicle sensors are designed and calibrated to detect cars, trucks, buses, and other typical traffic components down to and including a small motorcycle. Unfortunately, inductive loop vehicle sensors and the medium wavlength (3–5 micron) hot spot infrared sensors generally cannot detect pedestrians, animals, and smaller vehicles such as bicycles and some utility trailers. Additionally, inductive loop sensors will not detect vehicles or debris made from nonferromagnetic materials such as aluminum, brass, fiberglass, plastic, glass, rubber, etc.

Algorithm Development

Many computer algorithms have been developed to more-or-less automate the process of traffic-related incident detection, but none have produced acceptable results. Many of the systems are sluggish and can take many tens of minutes to detect congestion resulting from an incident. Indeed, if traffic is light, congestion may not occur in the vicinity of an incident and the incident may then not be detected at all. If congestion detection thresholds are changed in order to make the systems more responsive, then the high level of false alarms generated within the systems becomes prohibitive. Work on these algorithms has evolved to encompass geographically close traffic conditions such as increasing congestion prior to an incident, and a rapid decrease after an incident due to "rubbernecking" on roadways opposite an incident location. These features have been used within the algorithms in order to more accurately detect when incidents are the cause for congestion, and although there has been some success with this approach, the time required to gather this data largely precludes the use of these techniques in modern traffic management systems.

Improved traffic management systems based on the use of inductive loop sensors and/or visible spectrum cameras and/or infrared cameras would preferably overcome the above difficulties, but to date, none have.

SUMMARY OF THE INVENTION

The present invention comprises apparatus and methods for substantially automatic and real-time location of roadways and road shoulders, characterization of vehicular traffic (including location, speed, volume and direction), and detection of traffic-related incidents on or near a freeway, highway or other roadway. Because traffic-related incidents may involve warm (not hot) objects (such as the appearance of a person or animal in a roadway), the infrared sensor of the present invention operates preferably in the wavelength range of about 10 to about 20 microns. To avoid confusion of vehicles with other infrared-emitting objects, the present invention uses an improved vehicle recognition algorithm which avoids ambiguities inherent in bright point or hot spot infrared approaches. Also, in order to improve the identification of cold objects (such as the appearance of a trailer, tire carcass or piece of scrap iron in the roadway), the visible spectrum color video camera of the present invention is present in some embodiments.

Due to the desirability of compact size, high sensitivity and a relatively wide field of view in visible spectrum and infrared cameras of the present invention, each camera preferably comprises a relatively fast large-aperture telescope (as, for example, a Schmidt telescope) suitable to the wavelength of electromagnetic radiation to be transmitted. Where the visible spectrum and infrared cameras share portions of a single telescope, the shared portion will preferably comprise mirror optics to reduce the incidence of chromatic aberration and losses due to transmission through solids. Further, mirror optics are preferably designed with reflective surfaces which are deformable by predetermined amounts (by, for example, the controlled application of deforming forces resulting from differential air pressures and/or electromagnetic field gradients imposed across the reflective surfaces). By controlling the deforming forces applied to deformable reflecting surfaces through closed-loop feedback control systems, telescope focus and field of view may be altered in substantially real time to allow improved detection of traffic-related incidents in inclement weather and/or low light conditions.

Vehicular traffic paths are preferably characterized by observed vehicle movement. Normally moving vehicles themselves are preferably identified not as mere hot spots, but by an improved multi-element infrared signature comprising, for example, a relatively cooler infrared image region located over a relatively warmer infrared image region. This characteristic multielement vehicle infrared signature may, in certain embodiments, be replaced and/or augmented by one or more visible spectrum radiation patterns (visible spectrum signatures) which also tend to characterize the vehicle in question. Additional infrared and/or visible spectrum elements may be incorporated in vehicle recognition algorithms to further increase accuracy and decrease the likelihood of false alarms.

As noted above, traffic-related incidents detectable with the present invention include the appearance (or disappearance) of substantially stationary objects on a roadway or shoulder area. Other incidents may include, for example, vehicles moving against traffic (i.e., wrong way on a one-way street), speeding or slow-moving vehicles (relative to other traffic), erratically-moving vehicles (for example, vehicles not traveling at substantially constant speed, vehicles making excessive lane changes, and vehicles weaving within a lane), and vehicles moving at night without lights. Because of the substantially real-time warnings of traffic-related incidents obtainable from the present invention, it is particularly suitable for monitoring railroad crossings, tunnels, complex intersections and analogous high-traffic and/or particularly dangerous locations. In embodiments comprising closed-loop control systems for telescope optics, several such sites of particular interest can be monitored from one location.

Traffic-related incident measures are derived from the traffic-related incidents detected above. They comprise mathematical functions of the frequency, duration, type and/or intensity of traffic-related incidents, and/or their relative influence on such design parameters as roadway capacity, the expected incidence and severity of accidents, subjective driver evaluations, and maintenance costs.

Technologies used in the present invention allow identification of actual and potential traffic-related incidents (hazards) in substantially real time, in daylight or at night. The invention also provides the analytical ability to discriminate the location of such incidents with respect to the traffic lanes (vehicle paths) of roadways and to facilitate immediate and automatic classification of the incident severity (as measured, for example, by the predicted danger associated with the incident). Because the occurrence of each incident is detected in substantially real time, the time-since-occurrence is readily determined and can be shown on a display (showing, for example, which (potentially cold) vehicle has been stalled on the road shoulder longest). Situations posing particularly great risks are readily identified, including a vehicle stalled in a fast lane, a vehicle on fire (indicated by a scintillating, intensified and/or distorted infrared signature), or a vehicle on its side or upside down (indicated, for example, by a corresponding 90 or 180 degree rotation of its dual-temperature infrared signature). Because these important traffic-related incidents can be individually identified, their severity may be classified as an aid to resource allocation for traffic managers (or traffic management algorithms) in determining appropriate responses.

Further, discriminant functions comprising traffic-related incident measures in conjunction with, for example, environmental data (such as temperature, humidity, visibility, wind speed and precipitation), time of day, day of the week, time of the year, vacation and holiday schedules, and historical traffic-related incident records, can furnish objective bases for adjustment of speed limits in substantially real time. Criteria for timing of on-ramp lights and pedestrian crossing lights, for conversion of multi-use lanes, and for direction of traffic to alternate routes can also be established in light of traffic-related incident measures obtainable with the present invention either alone or through a human operator. Thus, the technologies used in this invention can interact to make roadway systems virtually instantly adaptive to changing conditions. Further, through more complete reporting of traffic-related incidents than is available with prior systems, together with a substantial reduction or elimination of time lags in such reporting, mathematical models of transportation system dynamic behavior can be improved. Better mathematical models, in turn, can reduce the likelihood of instabilities in the application of traffic flow control algorithms.

The present invention can be employed substantially as described above or as an adjunct to an existing Automated Traffic Management System (ATMS) or Intelligent Transportation System (ITS). Alone or in combination with other systems, the present invention can be used to alert law enforcement agencies and/or maintenance personnel to the location of disabled or stalled vehicles, to animals, debris and/or other stationary or slow-moving objects on or near the road, to vehicles being driven erratically or in the wrong direction, and/or to vehicles moving without lights at night, so that corrective action can be taken before an accident occurs. Early warnings useful for efficient dispatch of emergency medical care resources can also be derived from traffic-related incident measures alone or in combination with the additional data described above.

The invention includes apparatus and applications that can be implemented through use of that apparatus. For example, the invention includes a method for recognizing a vehicle location in an infrared image of a roadway. The method comprises identifying within the roadway image at least one area of relatively high thermal emission, locating within the roadway image an area of relatively low thermal emission over at least one of said areas of relatively high thermal emission to form a thermal emission pair, and recognizing a vehicle location as being indicated by each said thermal emission pair.

Another application of the invention comprises a method of automatically determining portions of a roadway in successive color images. The method comprises identifying a roadway color within a first color image, computationally comparing all pixel colors in at least one succeeding color image with the roadway color, and determining portions of a roadway in each succeeding image as comprising all pixels having substantially the roadway color. Having thus provided for determination of portions of a roadway, the invention also includes a method of determining the location of a roadway in a color image comprising a roadway. The method comprises determining at least one portion of a roadway by the above method, and computationally applying morphological region grow and shrink means to pixels of each portion of a roadway so determined.

Recognizing that a region of interest of a traffic management system often includes more than simply the roadway, the invention also includes a method of determining the location of a region of interest, which may include both the roadway and the road shoulder, in an image comprising a roadway. The method comprises determining at least one portion of a region of interest (such as a roadway or shoulder) in the image by methods described above or by operator-assisted interactive operations which define boundaries of each such portion. The method further comprises computationally applying morphological region grow and shrink means to pixels of each such portion to determine (more generally) the location of the region of interest.

Because camera motion is often encountered in image-based traffic control systems, the invention includes a method of automatically recalibrating camera orientation with respect to a roadway after a camera has been moved. The method comprises obtaining at least one initial camera image of the roadway (associated with a first camera position) and constructing (and then storing in memory means) at least one template means, each template means containing at least one feature to be sought in at least one subsequent image associated with a second camera position. After obtaining at least one subsequent camera image of the roadway, comparison means, such as cross-correlation or normalized cross-correlation is then employed to compare at least one template means with at least one subsequent camera image to seek at least one of the features contained in the template means in the subsequent images obtained after the camera has been purposefully or inadvertently repositioned from the first to the second camera position. The disparity between the locations of the features in initial and subsequent images is then used as the basis for computing a recalibration transformation between the camera in its first position (which produced the initial image(s)) and in its second position (which produced the subsequent image (s)). The recalibration transformation is applicable to each subsequent camera image to substantially obtain an initial camera image. The last step in the method is actually recalibrating camera orientation with respect to the roadway by applying the recalibration transformation to at least one of the subsequent image(s).

As an aid to image analysis, either by a human operator or automatic means, the invention includes a method of removing moving objects from a time sequence of images. The method comprises calculating a median pixel characteristic value (pixel color, intensity or thermal emission intensity, for example) for each respective pixel in the image sequence, where the image sequence comprises at least a first image and a second image. Moving objects are then removed from the image sequence by replacing each respective pixel characteristic value in at least one image of the image sequence with each respective median pixel characteristic value.

Use of infrared images in the present invention allows use of a method of determining the location of a traffic lane portion in an infrared image through the presence of vehicular traffic on the roadway. The method comprises identifying within the infrared image at least one area of relatively high thermal emission and an area of relatively low thermal emission which is located over at least one of the areas of relatively high thermal emission to form a thermal emission pair. A vehicle location is then recognized in the image as being indicated by each of the thermal emission pairs. The location of a traffic lane portion in the infrared image is then determined as being under and proximate to each vehicle location. Locating the traffic lane of a roadway itself, after locating a portion of it in a time sequence of infrared images as above, is done by a method that determines the location of a traffic lane portion in each (or any one) of the sequence of infrared images as comprising each of the earlier-located traffic lane portions.

Identifying a vehicle path in a time sequence of images is a very useful technique in the present invention, and it may be accomplished by several alternative (complementary) methods. For infrared images, the method comprises calculating a maximum thermal emission value for each respective pixel in the image sequence, the image sequence comprising at least a first image and a second image. Each respective pixel thermal emission value in at least one image of the image sequence is then replaced with the respective maximum thermal emission pixel value found in any image, thus making a thermal emission composite image. A vehicle path in the image sequence is then identified as a curvilinear form in the thermal emission composite image which is substantially not present in any single image in the image sequence. Note that lateral deviations of vehicles from an observed path of motion are generally limited by the conventional lateral forces that can be applied to the vehicles (as by wind or the frictional forces of tires on a roadway). Observed lateral path deviations greater that those that might be caused by conventional forces may be regarded as artifacts or as due to application of an unconventional lateral force (as from collision with a fixed object or another vehicle).

Another method of identifying a vehicle path in a time sequence of infrared images comprises calculating a minimum thermal emission value for each respective pixel in the image sequence, the image sequence comprising at least a first image and a second image. Each respective pixel thermal emission value in at least one image of the image sequence is then replaced with the respective minimum thermal emission pixel value found in any image to make a thermal emission composite image. As above, a vehicle path is identified in the image sequence as a curvilinear form in the thermal emission composite image which is substantially not present in any single image in the image sequence.

Still another method of identifying a vehicle path in a time sequence of infrared images comprises identifying within each respective image of the sequence at least one area of relatively high thermal emission and an area of relatively low thermal emission which is located over at least one of said areas of relatively high thermal emission to form a thermal emission pair. A vehicle location is then recognized as being indicated in each said thermal emission pair. After In distinctively labeling at least one pixel chosen to characterize each said vehicle location, each of the distinctly labeled pixels is incorporated in at least one image of the image sequence to form a vehicle location composite image. A vehicle path is then identified in the image sequence (as above) as a curvilinear form (comprising distinctly labeled pixels) which is present in the vehicle location composite image, but which is substantially not present in any single image in the image sequence.

For a time sequence of nighttime visual spectrum images, a method of identifying a vehicle path in the images comprises calculating a maximum visible light intensity value for each respective pixel in the image sequence, the image sequence comprising at least a first image and a second image. Each respective pixel visible light intensity value is then replaced in at least one image of the image sequence by the respective maximum pixel visible light intensity value, thus making a visible light composite image. A vehicle path in the nighttime image sequence is then identified as a curvilinear form in the visible light composite image which is substantially not present in any single image in the image sequence. Note that nighttime is defined as any time the required visual spectrum images can be obtained. Note also that in the present invention, visible light and infrared images need comprise only portions of the visible light or infrared spectra respectively. Indeed, certain portions of the spectra may be removed (as by optical glass or plastic filters or by digital processing) in any image or image sequence to enhance detection of features, locations and events.

Having described several methods of identifying a vehicle path in a time sequence of images, the present invention includes several ways of using this information to characterize traffic flow and detect traffic-related incidents. One method of estimating vehicle speed in a time sequence of camera images (the images, of course, comprising a roadway), comprises identifying the path of a single vehicle by any of the above methods in each of two images of the sequence. The path length traversed by the vehicle is then estimated in the two images based on camera perspective with respect to the roadway (that is, trigonometric relationships are used to calculate true path length differences even when a camera is not viewing the paths perpendicularly). Then a time difference is estimated between the two images, and vehicle speed is estimated by dividing the estimated (true) vehicle path length difference by the estimated time difference. Alternatively, the system may be calibrated by driving a test vehicle along the path at a constant and known speed and recording the time difference between specific path points to compensate for camera perspective.

Slow vehicles can be identified in a time sequence of images by a method comprising estimating vehicle speed for each vehicle as above and identifying vehicles moving faster than a predetermined speed. Speeding vehicles can be identified by an analogous method in which vehicles moving faster than a predetermined speed are identified in the image sequence.

Analogously, vehicles at erratic speeds in a time sequence of images can be identified by a method comprising estimating a vehicle speed for each vehicle by the method described above and identifying in the image sequence vehicles having a speed range which exceeds a predetermined upper limit.

Vehicles moving against traffic in a time sequence of images of a one-way roadway can be identified by a method comprising estimating a vehicle speed for each vehicle moving on the roadway as described above and then identifying the substantially uniform direction of motion of at least half of the vehicles moving on the roadway as positive motion. Vehicles moving on the roadway but not in the substantially uniform direction of motion previously identified are then identified as moving against traffic.

Identifying vehicles experiencing excessive lateral movement (that is, for example, changing lanes or weaving within lanes) in a time sequence of images can be done by a method comprising identifying a normal traffic lane on a roadway by one of the above methods at a first time. A vehicle path is then identified for each vehicle by one of the above methods at a second time later than the first time. Computationally comparing the normal traffic lane with the vehicle path for each vehicle provides a path difference value for each vehicle, allowing identification of a vehicle as experiencing excessive lateral movement when the path difference value exceeds a predetermined amount.

A method of identifying vehicles moving on a roadway at night without lights in a time sequence of images comprises identifying the specific location of a vehicle along a first vehicle path for each vehicle by one of the above infrared-based methods, and simultaneously attempting to confirm the location of the vehicle at the same location by visual spectrum radiation. Assuming adequate visibility, a failure to confirm the vehicle location by visual spectrum radiation (which would comprise a search for evidence of a radiation spectrum from the identified vehicle location characteristic of vehicle headlights and/or tail lights and/or parking lights) would imply that the vehicle should be identified as a vehicle moving on a roadway at night without lights.

A very useful technique in identifying actual or potential hazards in traffic is a method of signaling the appearance of substantially stationary objects in a region of interest comprising a roadway and shoulder area in a time sequence of images of the region of interest. Complementing this method is an analogous method of signaling the disappearance of substantially stationary objects in a region of interest in which the appearance of one or more objects has already been signaled. The former method comprises determining the location of a roadway in at least two images of the time sequence available at a first time by one of the methods described above, the images comprising a first image subset. Moving objects are removed from images of the first image subset as described above, and a first reference image is chosen from the first image subset. For signaling the disappearance of substantially stationary objects, the first reference image is chosen from an image subset available at a first time prior to the appearance of the objects as signaled by the method above. At least two additional images of the time sequence are obtained after a second time, the second time being later than the first time, and the additional images comprise a second image subset. Moving objects are removed from images of the second image subset as above, and a second reference image is chosen from the second image subset. The first and second reference images are then computationally compared. Detecting significant differences signals the appearance of substantially stationary objects in the region of interest between the first time and the second time. On the other hand, detecting no significant differences corresponding to the stationary objects signals the disappearance of substantially stationary objects in the region of interest between the first time and the second time.

Having described methods for signaling the appearance or disappearance of substantially stationary objects in a region of interest, the present invention also includes a method of determining the oldest substantially stationary object in a plurality of substantially stationary objects appearing in a time sequence in a region of interest comprising a roadway and shoulder area. The method comprises signaling the first appearance of each object of the plurality of substantially stationary objects in the region of interest by the method described above to form an ordered time sequence of appearance signals. Each appearance signal corresponds to the first appearance of one substantially stationary object in the region of interest. The next step is signaling the disappearance of each object of the plurality of substantially stationary objects in the region of interest by the method described above to form a disappearance signal corresponding to each object disappearance. Removing from the time sequence of appearance signals each appearance signal corresponding to an object for which a disappearance signal exists results in a time sequence of appearance signals which contains only those appearance signals for objects which remain in the region of interest. One may then determine the oldest substantially stationary object in the plurality of substantially stationary objects to be the object corresponding to the earliest of the time sequence of appearance signals not removed in the above removing step.

Another use for the above methods is a method of signaling the duration prior to a current time of the presence of substantially stationary objects in a relatively high-risk region of interest in a time sequence of images of the region of interest. The method comprises signaling the first appearance of each substantially stationary object in the region of interest by the method above at a first time, and signaling the duration of the presence of each said substantially stationary object as time elapsed from the first time to the current time.

The direction of traffic movement in a color image at night can be characterized by a method of the invention which comprises computationally comparing the spectrum of each pixel of the color image to a first predetermined spectrum characteristic of headlights and to a second predetermined spectrum characteristic of taillights. Traffic may be characterized as oncoming when the computational comparison shows no significant difference between the pixel spectrum and the first predetermined spectrum, and as outgoing when the computational comparison shows no significant difference between the pixel spectrum and the second predetermined spectrum.

Vehicle types can be characterized in an infrared (or visible spectrum light) image by well-known techniques comprising obtaining an infrared (or visible light) signature of an unknown vehicle type and computationally comparing the unknown infrared (or visible light) signature with at least one stored infrared (or visible light) signature for a known vehicle type. The unknown vehicle type is then characterized by similarity of its infrared (or visible light) signature to at least one stored infrared (or visible light) signature for a known vehicle type. This information may be used to augment vehicle characterizations by methods of the present invention to reduce the likelihood of error and/or to establish or refine confidence limits for decision criteria in the present invention.

The present invention also includes apparatus for detecting traffic-related incidents in a roadway region of interest.

The apparatus comprises at least one infrared camera for producing a time sequence of infrared images of the roadway region of interest. Optionally, at least one color (visible spectrum) video camera may be included for producing a time sequence of visible spectrum images of substantially the same roadway region of interest. Frame-grabber means (analogous to those found in commercially-available video editing systems) allow pixel-level digital analysis of each of the infrared and visible spectrum images, and programmable digital computer means (comprising commercially-available digital computers and digital mass storage memory means for algorithm and image storage) facilitate analysis of the time sequences of infrared and visible spectrum images. Either infrared or visible spectrum images may be used to detect traffic-related incidents in the roadway region of interest, but combining both methods provides confirmation and additional information about the incident. Wireless links are optionally provided between separate components, and optional alarm means are provided to warn support staff of an actual or anticipated need for law enforcement, maintenance or emergency medical services. Optional incorporation of one or more existing inductive loop sensors may also be provided in preferred embodiments.

The severity of traffic-related incidents detected by the above apparatus may be characterized by operations on a time sequence of infrared images of a region of interest comprising a roadway. Severity is characterized by a method comprising recognizing a vehicle type and/or location and/or orientation and/or other factors which may comprise traffic hazards and/or traffic-related incidents in a first infrared image of the time sequence by the method described above.

For example, rotation of the thermal emission pair that indicates rotation of the vehicle through an angle of about 90 degrees in a second infrared image of the time sequence indicates that the vehicle is on its side, and may be characterized as a severe traffic-related incident. Rotation of the thermal emission pair through an angle of about 180 degrees in a second infrared image of the time sequence indicates that the vehicle has rolled over on its roof, and may be characterized as a more severe traffic-related incident. Scintillation of at least one area of relatively high thermal emission of the thermal emission pair in a second infrared image of the time sequence indicates that the high thermal emission is from a fire; this may be characterized as a most severe traffic-related incident. Note that for all steps of this method, the second infrared image is subsequent to the first infrared image in the time sequence.

Another example of a method of characterizing severity of traffic-related incidents in a time sequence of images of a region of interest comprising a roadway is as follows. The method comprises recognizing the appearance of a substantially stationary object in the region of interest (for example, a stalled car in a roadway) by the method above, and characterizing the appearance of the substantially stationary object (that is, the stalled car) as a severe traffic-related incident.

Thus recognized, located and characterized through use of the present invention, traffic-related incidents can be quickly evaluated for their probable effect on transportation system operation, and appropriate corrective action can be initiated without substantial delay.

DETAILED DESCRIPTION

Figure 1:
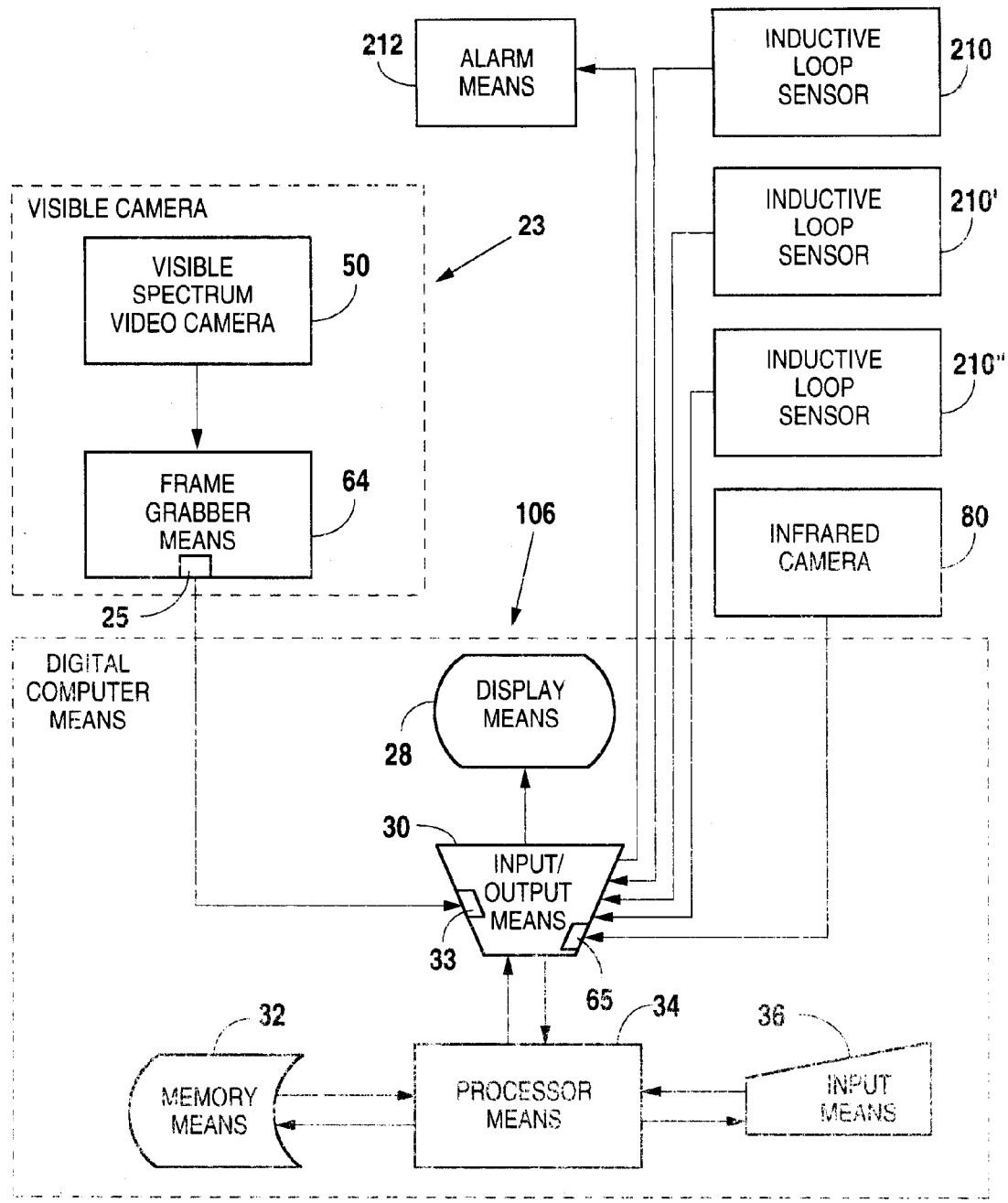
FIG. 1 schematically illustrates apparatus for detecting traffic-related incidents in a roadway region of interest, including optional features.

The methods of the present invention exhibit several advantages over other traffic incident monitoring system types proposed or in use. The response of the present invention to the appearance of stationary objects on or near a roadway is virtually immediate, and with proper camera placement, false alarms may be substantially reduced, if not eliminated. Additionally, camera placement and predetermined threshold values can be chosen so that there are virtually no missed incidents. The invention's methods work equally well during daylight, transition, and dark conditions. Performance is also not substantially degraded during rain, fog, ice, and snow conditions or intense sources of artificial light. Indeed, the invention may be used to detect certain localized road conditions (for example, snow and/or black ice and/or water and/or fuel on a portion of the roadway). Automatic interpretation of predetermined features in the image allows several levels of alarm, based on potential threat of injuries or potential for causing incidents. These methods provide the opportunity to highlight, encircle, or otherwise indicate which object(s) in a scene have caused an alarm signal.

The strong feature-based model for a vehicle produced by the infrared camera provides the opportunity for more reliable automatic recognition of a vehicle than competing systems. This feature-based model also provides the opportunity for automatic recognition of an abnormal attitude presented by a stationary vehicle. Fusion of the infrared and color video camera technologies with mechanical coupling of the cameras provides the opportunity to automatically and reliably establish a region of interest in complex scenes which can effectively restrict the alerting (alarm) signals provided to a human operator to areas within and near the roadway. An example of this would be use of infrared and color video cameras to allow detection of a vehicle running without lights at night and to determine the orientation of a vehicle at night. Fusion of infrared and color video camera technologies also allows one or both images to be used for operator-controlled surveillance and then returned to automatic incident detection and classification duty by operator command.

The present method allows automatic determination of the presence of pedestrians, animals, or other warm objects within a region of interest at night when sufficient lighting for visible spectrum camera images is not available, especially in the presence of point sources such as street lights and headlamps from oncoming traffic. The invention may be used alone or in conjunction with inductive vehicle presence sensors to detect congestion and develop numerical traffic data, in addition to detection and classification of traffic-related incidents. Images obtained with the invention are substantially immune to interference from direct or reflected sunlight and from artificial lights. In contrast to the widely-spaced inductive sensors commonly used, the invention inherently provides practically infinite resolution in the coverage of a highway segment. Within its range, it can detect stationary objects on or near the roadway (including nonmetallic debris such as wooden boxes, etc.) that inductive loop sensors will not detect under any circumstances. And the geometry and locations (coverage areas) of virtual loop sensors of the present invention (image processing regions of interest) are reconfigurable in software, a feature not available with the current hardware loop sensors. Hence, one could (in software) place and configure a relatively high-resolution and substantially real-time virtual loop sensor wherever it is of greatest utility without the traffic disruption and relatively low resolution that would be associated with installing a conventional (hardware) loop sensor.

Images of the thermal radiation produced from the heat of vehicles and other objects will preferably be obtained using a far-infrared (IR) camera sensitive to electromagnetic radiation in the range of 10–20 microns. Images of the electromagnetic radiation in the visible light spectrum will preferably be obtained using a charge-coupled device color camera sensitive to red, green, and white wavelengths corresponding to the color model for human vision. Preferred embodiments of the invention may involve the use of both IR and color cameras that are mechanically coupled such that the three-dimensional position and orientation of each camera relative to the other is known. This will permit, for example, the detection of a vehicle at night (using IR) while inferring that its lights are off, a technique that could not be applied without both sensors and knowledge of the three-dimensional transform between them.

Images of the roadway and associated areas of interest, including moving and stationary vehicles, will preferably be stored electronically in digital memory means. Digital image data will be obtained from a video digitizer for converting the analog signals from the camera(s) to digital values. Relatively short-term storage of the digital representation of camera images will preferably occur in frame-grabber means as commonly found in commercially-available digital video editing systems.

While the preferred means of recognizing the typical IR pattern or signature of vehicle types is by use of the image of low thermal emission from the metal and glass located over the image of a region of high thermal emission from the engine, exhaust and drivetrain components under the car, certain distinctive features (such as the pattern of a vertical exhaust pipe on a heavy truck) can aid in typing vehicles for traffic surveys.

All of the methods enumerated above are preferably performed using the computational capabilities of programmable digital computers so that the results are obtained in the time required to scan several video frames. This provides the capability for real time detection of multiple traffic incidents or hazards so that practically immediate response can be provided. The use of stored program computers also provides the capability of performing monitoring and control functions automatically, that is, substantially without operator assistance. In some cases, however, it may be desirable to make use of operator assistance. In this case the computer can be programmed to activate supplemental displays and/or alarms, and/or to add graphic symbols to a monitor screen to highlight or otherwise distinguish the significant region or vehicle of interest image and direct the operator's attention to a specific incident or hazard.

Apparatus for detecting traffic-related incidents in a roadway region of interest is schematically illustrated in FIG. 1. The apparatus comprises digital computer means 106, optional inductive loop sensors 210, 210', 210", and visible spectrum camera means 23 (comprising, in, turn visible spectrum video camera 50 and frame-grabber means 64), with optional wireless transmitter 25 corresponding to optional wireless receiver 33 of computer input-output means 30. Infrared camera 80 is wired to frame-grabber means 65 which also resides in computer input-output means 30, and optional external alarm means 212 can be activated through computer input-output means 30. In addition to input-output means 30, computer means 106 comprises memory means 32, processor means 34, display means 28 and manually-actuated input means 36.

Input-output means 30 in preferred embodiments may be configured to receive signals transmitted, for example, by insulated electrical conductor(s) and/or to receive wireless (e.g., radio or infrared) signals from wireless transmitter means 25 with wireless receiver means 33. Flow of signals through input-output means 30 to processor means 34 and memory means 32 is controlled by processor means 34 using instructions (that is, a program) stored in memory means 32 and/or instructions from manually-actuated input means 36. Processor means 34 includes a time base to facilitate calculation of time intervals between images and speeds (distance traveled per unit time). Depending on the embodiment of the invention considered, processor means 34 preferably executes image-processing algorithms according to the methods described herein and presents a desired processed image on display means 28 through input-output means 30. Note that display means 28 may comprise two or more video monitors for substantially simultaneous display of different kinds of traffic-related incidents (such as slow moving vehicles, erratically moving vehicles, vehicles moving against traffic and/or the appearance of stationary objects on a roadway).

Memory means 32 may comprise, for example, magnetic tape, magnetic disks, or non-magnetic solid-state devices (e.g., optoelectronic memory or solid state switches). Manually-actuated input means 36 may comprise, for example, magnetic cards, paper or magnetic tape, a key board, one or more switches, or graphical pointing means such as a computer mouse, trackball or light pen. Processor means 34 and input-output means 30 may take the form, in preferred embodiments, of the analogous sections of a personal computer, as may display means 28. However, display means 28 may comprise, in addition to or in place of one or more video display screens, a digital readout device and/or an auditory alarm indication to direct an operator's attention to an event indicated on a display screen. Note also that one or more display screens of display means 28 may carry substantially unprocessed real-time video images of roadways and proximate regions of interest. Optional alarm means 212 can furnish warnings of traffic-related incidents and their locations to support personnel in law enforcement, maintenance and/or emergency medical services.

What is claimed is:

1. A method for recognizing a vehicle in a roadway, the method comprising:
   acquiring an infrared image;
   locating within the roadway image a thermal emission pair having an area of relatively low thermal emission adjacent to and above an area of relatively high thermal emission; and
   recognizing a vehicle as being indicated by said thermal emission pair.

2. The method of claim 1, further comprising the step of further processing the infrared image proximate to the thermal emission pair to determine a distinctive feature associated with a vehicle.

3. The method of claim 1, wherein the identifying step is performed by detecting long wave infrared radiation.

4. The method of claim 1, further comprising the step of further processing the thermal emission pair to determine the orientation of the vehicle.

5. The method of claim 1, further comprising the steps of acquiring a visual image of the roadway and of comparing the visual image to the infrared image.

6. The method of claim 5, wherein the comparing step is performed such that it determines whether a vehicle has active headlights.

7. The method of claim 5, wherein the comparing step is performed such that it determines the orientation of a vehicle.

8. The method of claim 5, further comprising the step of determining the three dimensional field of view of the infrared image relative to the visual image.

9. The method of claim 1, further comprising the steps of repeating the acquiring, locating, and recognized steps for a series of images, and of processing the images to determine the motion of the vehicle.

10. The method of claim 9, wherein the processing step is performed by removing moving objects from the series of images and comparing the resulting image to a reference image.

11. A method of recognizing the traffic lane portion of a roadway, comprising the steps of:

acquiring a series of infrared images of the roadway;

in each image of the series, locating a vehicle by detecting within the image a thermal emission pair having an area of relatively low thermal emission adjacent to and above an area of relatively high thermal emission;

tracking the motion of the thermal emission pair;

identifying the traffic lane as the path followed by the thermal emission pair.

12. The method of claim 11, wherein the identifying step is performed by detecting long wave infrared radiation.

13. The method of claim 11, further comprising the step of processing the images to remove moving objects from the images, thereby obtaining a filtered image.

14. The method of claim 11, further comprising the step of comparing the processed image to a reference image to determine the presence of a stationary object in the filtered image.

15. The method of claim 11, further comprising the step of detecting an object outside the vehicle path.

16. The method of claim 11, further comprising the step of repeating the locating and tracking steps to identify a thermal emission pair moving erratically within the traffic lane.

17. The method of claim 11, further comprising the step of repeating the locating and tracking steps to identify a thermal emission pair and the step of processing the thermal emission pair to determine its orientation within the traffic lane.

18. The method of claim 11, further comprising the step of repeating the locating and tracking steps to identify a thermal emission pair moving the wrong direction within the traffic lane.

19. The method of claim 11, further comprising the step of repeating the locating and tracking steps to estimate the speed of a subject thermal emission pair.

20. The method of claim 19, wherein the estimating step is performed by determining the path length and travel time of the subject thermal emission pair.

21. The method of claim 11, wherein the tracking step is performed by labeling at least one pixel representing the vehicle, forming a vehicle composite image comprised of the series of images and containing the labeling pixels, and identifying a curvilinear form in the composite image.

22. A traffic incident detection system, comprising:

an infrared detector; and a processing system having a processor and processor memory, operable to receive image data signals of a roadway from the infrared detector, and further operable to process the image data signal by locating a thermal emission pair having an area of relatively low thermal emission adjacent to and above an area of relatively high thermal emission, and to identify the thermal emission pair as a vehicle.

* * * * *